(12) United States Patent
Oga et al.

(10) Patent No.: US 11,088,422 B2
(45) Date of Patent: Aug. 10, 2021

(54) METHOD FOR MANUFACTURING LAMINATED BUS BAR, MANUFACTURING APPARATUS FOR LAMINATED BUS BAR, LAMINATED BUS BAR

(71) Applicant: Yazaki Corporation, Tokyo (JP)

(72) Inventors: Tatsuya Oga, Shizuoka (JP); Yoshiaki Ichikawa, Shizuoka (JP); Mariko Nakagawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/985,051

(22) Filed: Aug. 4, 2020

(65) Prior Publication Data

US 2021/0043909 A1 Feb. 11, 2021

(30) Foreign Application Priority Data

Aug. 7, 2019 (JP) .............................. JP2019-145507

(51) Int. Cl.
| | |
|---|---|
| *H01M 50/502* | (2021.01) |
| *A01D 9/04* | (2006.01) |
| *H01B 13/00* | (2006.01) |
| *H01R 11/01* | (2006.01) |
| *H01R 11/09* | (2006.01) |

(52) U.S. Cl.
CPC ............ *H01M 50/502* (2021.01); *A01D 9/04* (2013.01); *H01B 13/0026* (2013.01); *H01B 13/0036* (2013.01); *H01R 11/01* (2013.01); *H01R 11/09* (2013.01); *H01M 2220/20* (2013.01)

(58) Field of Classification Search
CPC ............ H01M 50/502; H01M 2220/20; H01B 13/0026; H01B 13/0036; H01R 11/01
USPC ...................................................... 174/129 B
See application file for complete search history.

(56) References Cited

U.S. PATENT DOCUMENTS

| | | | | |
|---|---|---|---|---|
| 5,517,063 | A | * | 5/1996 | Schantz, Jr. .............. B60L 3/00 307/9.1 |
| 2018/0123334 | A1 | * | 5/2018 | She .......................... H05K 7/02 |
| 2018/0309281 | A1 | * | 10/2018 | Ichikawa ............ H01M 50/502 |
| 2020/0106075 | A1 | | 4/2020 | Yanagida |

FOREIGN PATENT DOCUMENTS

JP 2018-106806 A 7/2018

* cited by examiner

*Primary Examiner* — Sherman Ng
(74) *Attorney, Agent, or Firm* — Kenealy Vaidya LLP

(57) ABSTRACT

A method for manufacturing a laminated bus bar includes a first base member forming process of forming a plurality of first through-holes in a conductive flat plate-shaped first base member, a second base member forming process of forming a conductive flat plate-shaped second base member, a laminating process of forming a laminated body configured by laminating and fixing flat surfaces of the first base member and the second base member on and to each other, and a punching process of forming, in the second base member of the laminated body, second through-holes forming pairs with the first through-holes, the second through-holes being smaller than the first through-holes in portions overlapping with the first through-holes in a lamination direction of the first base member and the second base member.

10 Claims, 8 Drawing Sheets

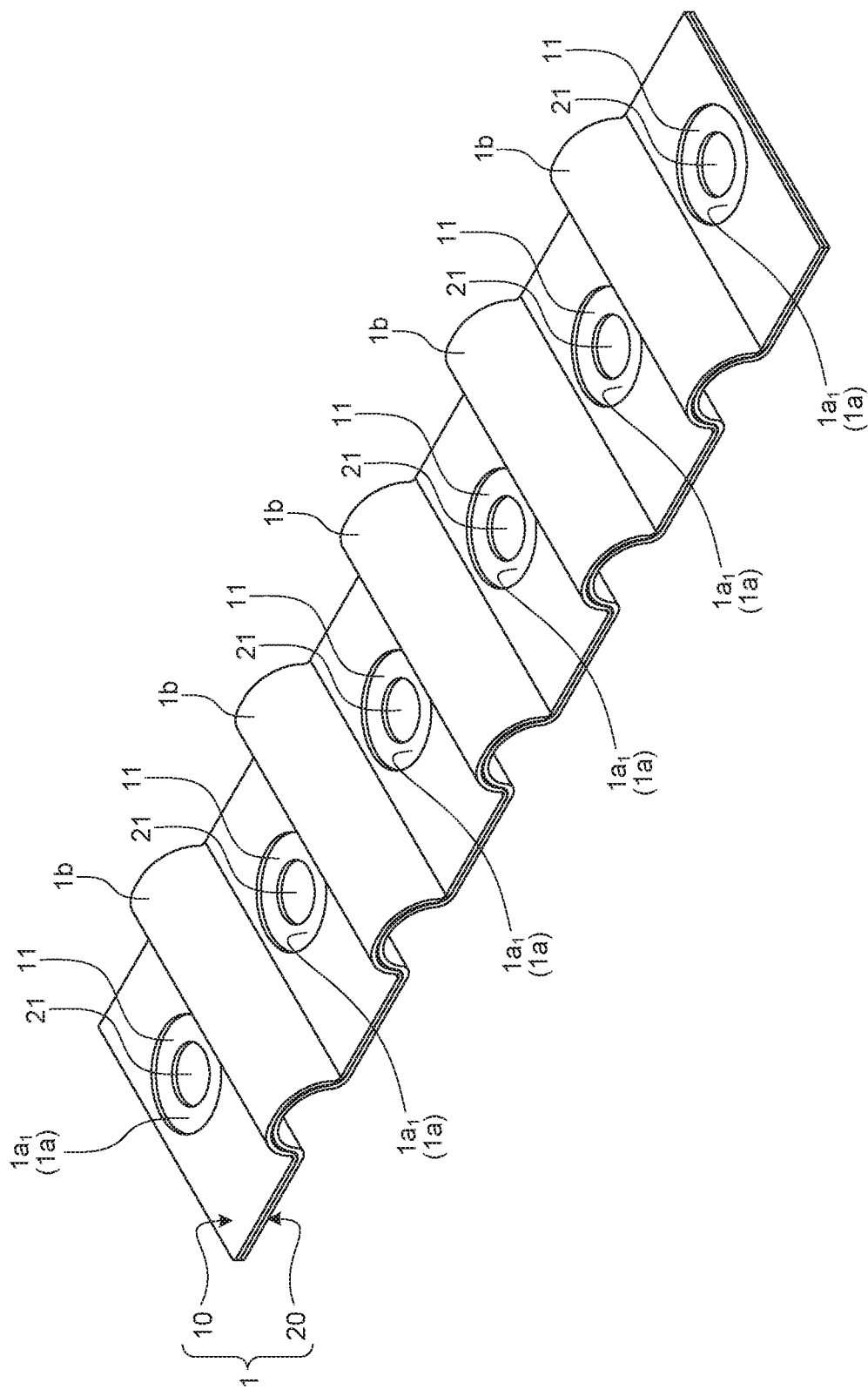

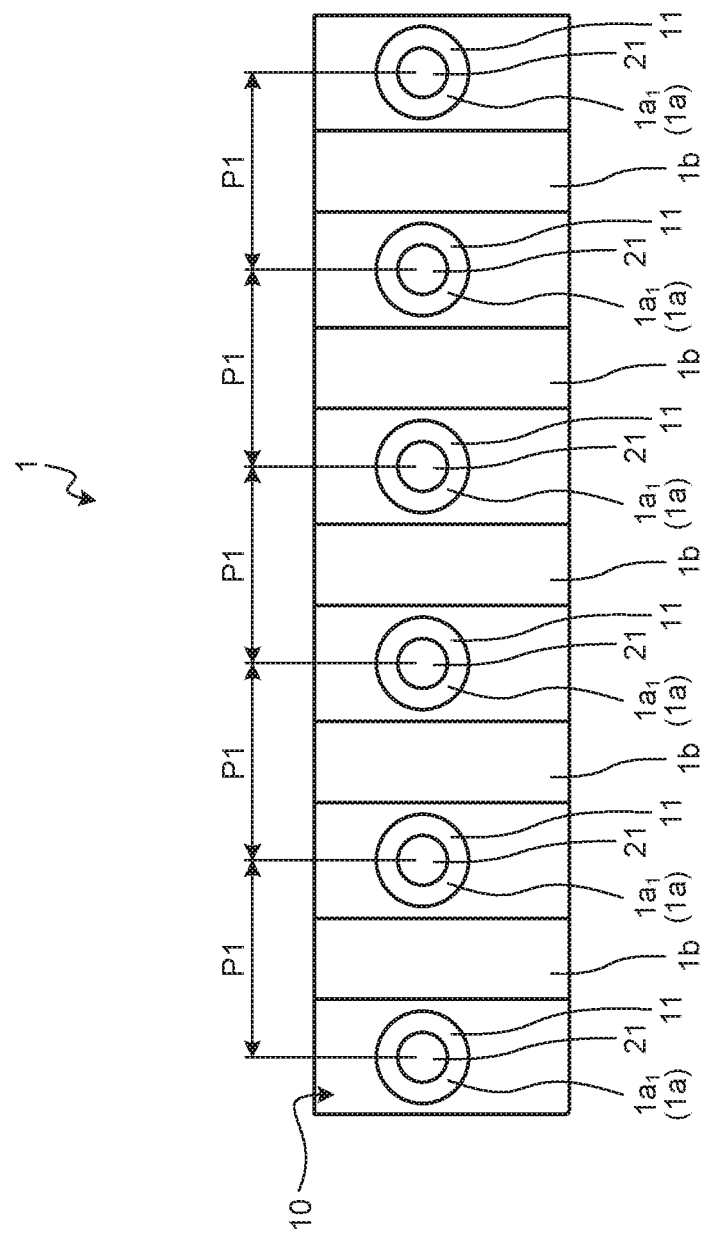

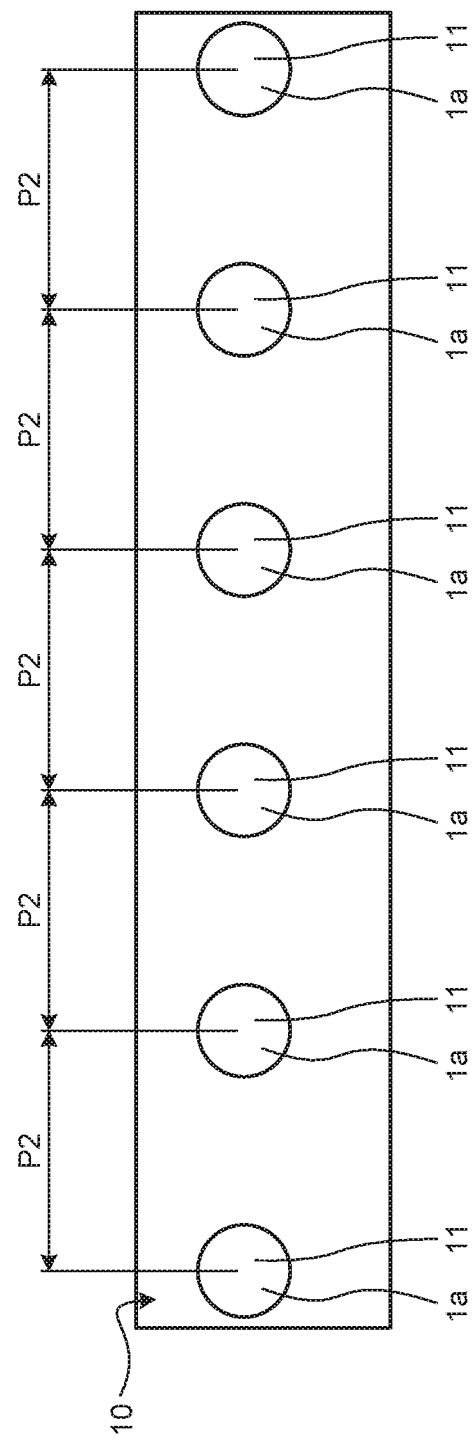

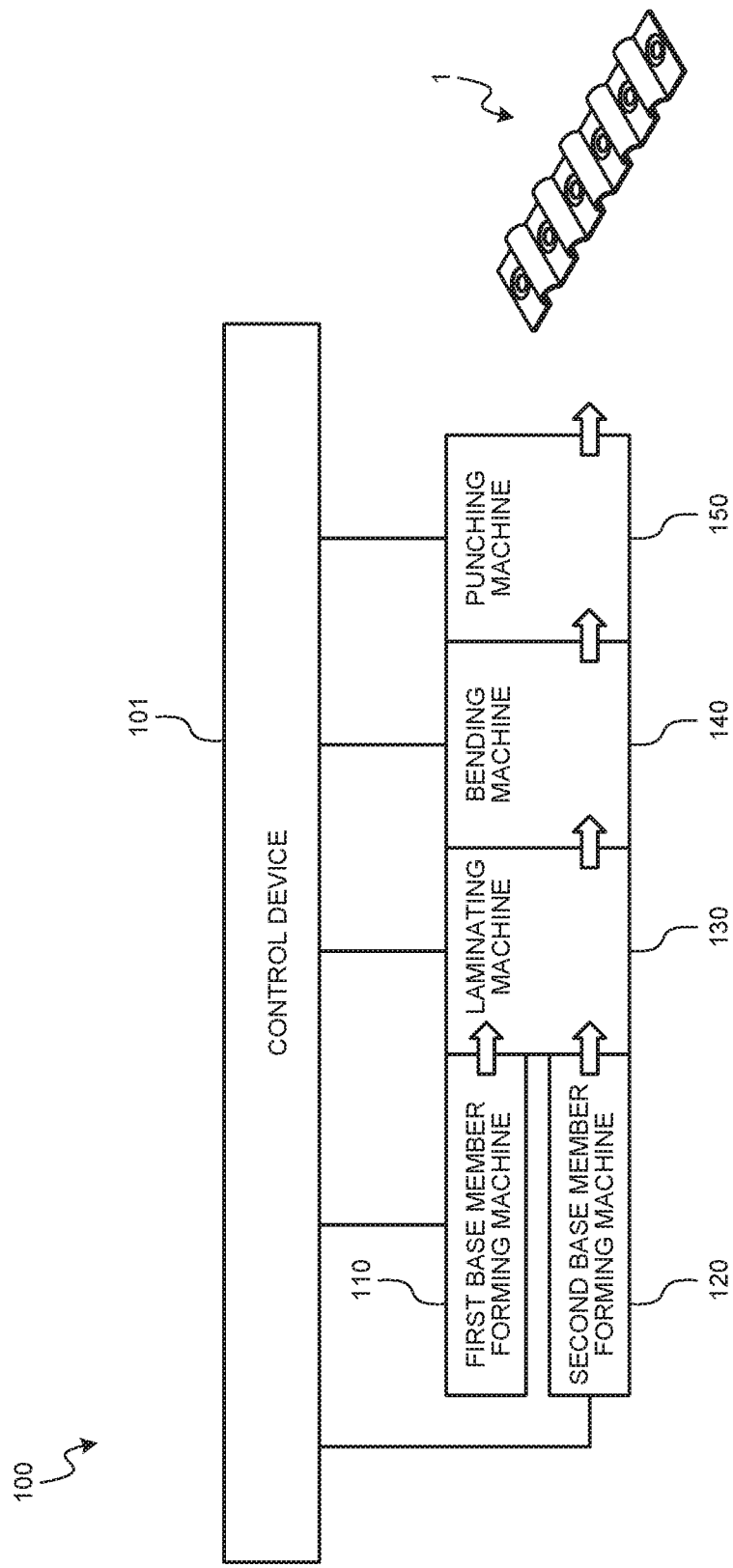

METHOD FOR MANUFACTURING LAMINATED BUS BAR, MANUFACTURING APPARATUS FOR LAMINATED BUS BAR, LAMINATED BUS BAR

CROSS-REFERENCE TO RELATED APPLICATION(S)

The present application claims priority to and incorporates by reference the entire contents of Japanese Patent Application No. 2019-145507 filed in Japan on Aug. 7, 2019.

BACKGROUND OF THE INVENTION

1. Field of the Invention

The present invention relates to a method for manufacturing a laminated bus bar, a manufacturing apparatus for the laminated bus bar, and the laminated bus bar.

2. Description of the Related Art

Conventionally, battery modules that feed electric power to rotary machines as driving sources are mounted on vehicles such as electric automobiles and hybrid cars. The battery module includes a plurality of battery cells arranged to be laminated on each other, and the battery cells are electrically connected in series or in parallel by a conductive member. A what-is-called bus bar having conductivity and a plate shape is used for the conductive member. In recent years, the conductive member of this type has been required to have an increased volume with increase in a calorific value of the battery cells. The conventional bus bar is increased in the plate thickness or is configured by bending one metal plate into a layered form, for example. Japanese Patent Application. Laid-open No. 2018-106806 discloses a bus bar for physically and electrically connecting positive and negative electrode terminals of adjacent battery cells, the bus bar having a two-layer structure formed by bending two sides of one rectangular metal plate.

The conventional bus bar in the layered form is configured by bending one metal plate into the layered form and therefore has a limitation on the plate thickness enabling a bending process in terms of strength, accuracy of a shape after the bending process, and the like. Accordingly, the conventional bus bar in the layered form has a room for improvement in increase of the volume thereof.

SUMMARY OF THE INVENTION

An object of the present invention is to provide a method for manufacturing a laminated bus bar, a manufacturing apparatus for the laminated bus bar, and the laminated bus bar capable of being adapted to a volume increase request.

In order to achieve the above mentioned object, a method for manufacturing a laminated bus bar according to one aspect of the present invention includes a first base member forming process of forming a plurality of first through-holes in a serially arrayed manner at a constant pitch in a conductive flat plate-shaped first base member; a second base member forming process of forming a conductive flat plate-shaped second base member; a laminating process of forming a laminated body configured by laminating and fixing flat surfaces of the first base member and the second base member on and to each other; and a punching process of forming, in the second base member of the laminated body, second through-holes forming pairs with the first through-holes, the second through-holes being smaller than the first through-holes in portions overlapping with the first through-holes in a lamination direction of the first base member and the second base member, the second through-holes in combinations of the first through-holes and the second through-holes forming the pairs being formed in a serially arrayed manner at a constant pitch.

According to another aspect of the present invention, the method for manufacturing a laminated bus bar, it is possible to configure that in the punching process, portions of the second base member that overlap with the first through-holes in the lamination direction in circumferential edges of the second through-holes in the second base member are formed as thin portions having small plate thicknesses in the first base member and the second base member in a laminated state.

According to still another aspect of the present invention, in the method for manufacturing a laminated bus bar, it is possible to further include between the laminating process and the punching process, a bending process of bending sites between the adjacent first through-holes in the laminated body to form bending portions that are elastically deformable along an array direction of the first through-holes.

According to still another aspect of the present invention, in the method for manufacturing a laminated bus bar, it is possible to configure that a pitch of the adjacent second through-holes is a pitch of adjacent electrode terminals of a plurality of battery cells adjacent to each other in a battery module in which the battery cells are arranged to be laminated on each other.

In order to achieve the above mentioned object, a manufacturing apparatus for a laminated bus bar according to still another aspect of the present invention includes a first base member forming machine that forms a plurality of first through-holes in a serially arrayed manner at a constant pitch in a conductive flat plate-shaped first base member; a second base member forming machine that forms a conductive flat plate-shaped second base member; a laminating machine that forms a laminated body configured by laminating and fixing flat surfaces of the first base member and the second base member on and to each other; a punching machine that forms, in the second base member of the laminated body, second through-holes forming pairs with the first through-holes, the second through-holes being smaller than the first through-holes in portions overlapping with the first through-holes in a lamination direction of the first base member and the second base member, the second through-holes in combinations of the first through-holes and the second through-holes forming the pairs being formed in a serially arrayed manner at a constant pitch.

In order to achieve the above mentioned object, a laminated bus bar according to still another aspect of the present invention includes a conductive plate-shaped first base member that has a plurality of first through-holes serially arranged at a constant interval; and a conductive plate-shaped second base member that has a plurality of second through-holes serially arranged at a constant interval and is laminated on and fixed to the first base member, wherein the second through-holes are smaller than the first through-holes, combinations of one of the first through-holes and one of the second through-holes forming pairs are arranged such that the first through-hole and the second through-hole in each of the combinations face each other in a lamination direction of the first base member and the second base member, portions of the second base member that overlap with the first through-holes in the lamination direction in circumferential edges of the second through-holes in the second base member are formed as thin portions having small plate thicknesses in the first base member and the second base member in a laminated state, and bending portions that are elastically deformable along an array direction of the first through-holes are formed between the adjacent, first through-holes.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a perspective view illustrating the laminated bus bar in the embodiment;

FIG. 6 is a plan view illustrating the laminated bus bar in the embodiment;

FIG. 7 is a plan view illustrating a laminated body of a first base member and a second base member during manufacturing; and FIG. 8 is a block diagram illustrating a manufacturing apparatus for the laminated bus bar in the embodiment.

DETAILED DESCRIPTION OF THE PREFERRED EMBODIMENTS

Figure 1:
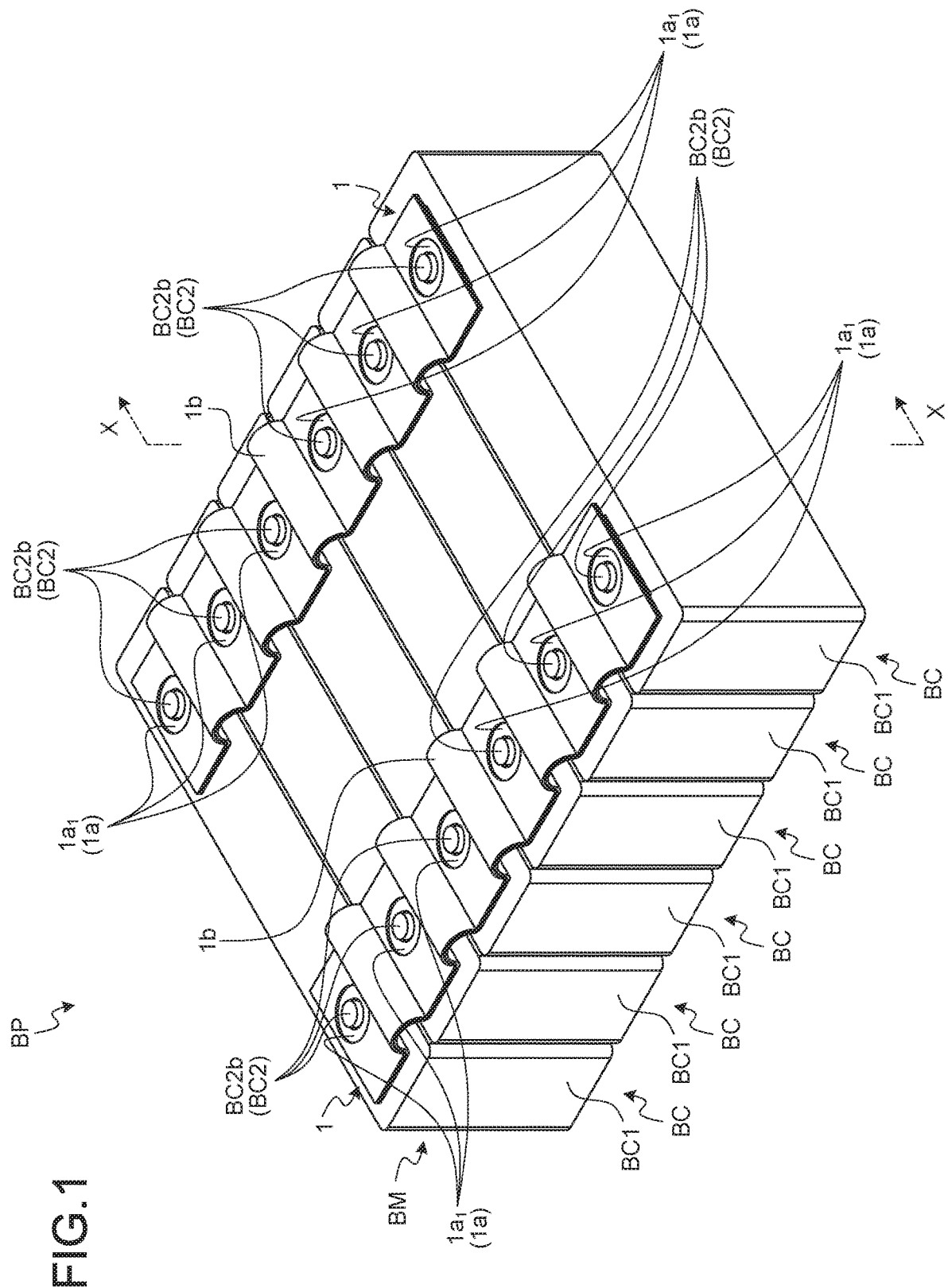
FIG. 1 is a perspective view illustrating laminated bus bars according to an embodiment together with a battery module.

Hereinafter, embodiments of a method for manufacturing a laminated bus bar, a manufacturing apparatus for the laminated bus bar, and the laminated bus bar according to the present invention will be described in detail with reference to the drawings. The embodiments do not limit the present invention.

Embodiment

One of embodiments of a method for manufacturing a laminated bus bar, a manufacturing apparatus for the laminated bus bar, and the laminated bus bar according to the present invention will be described with reference to FIG. 1 to FIG. 8.

A reference numeral 1 in FIG. 1 to FIG. 7 indicates a laminated bus bar produced by the manufacturing method in the embodiment. A reference numeral 100 in FIG. 8 indicates the manufacturing apparatus for the laminated bus bar 1.

Figure 3:
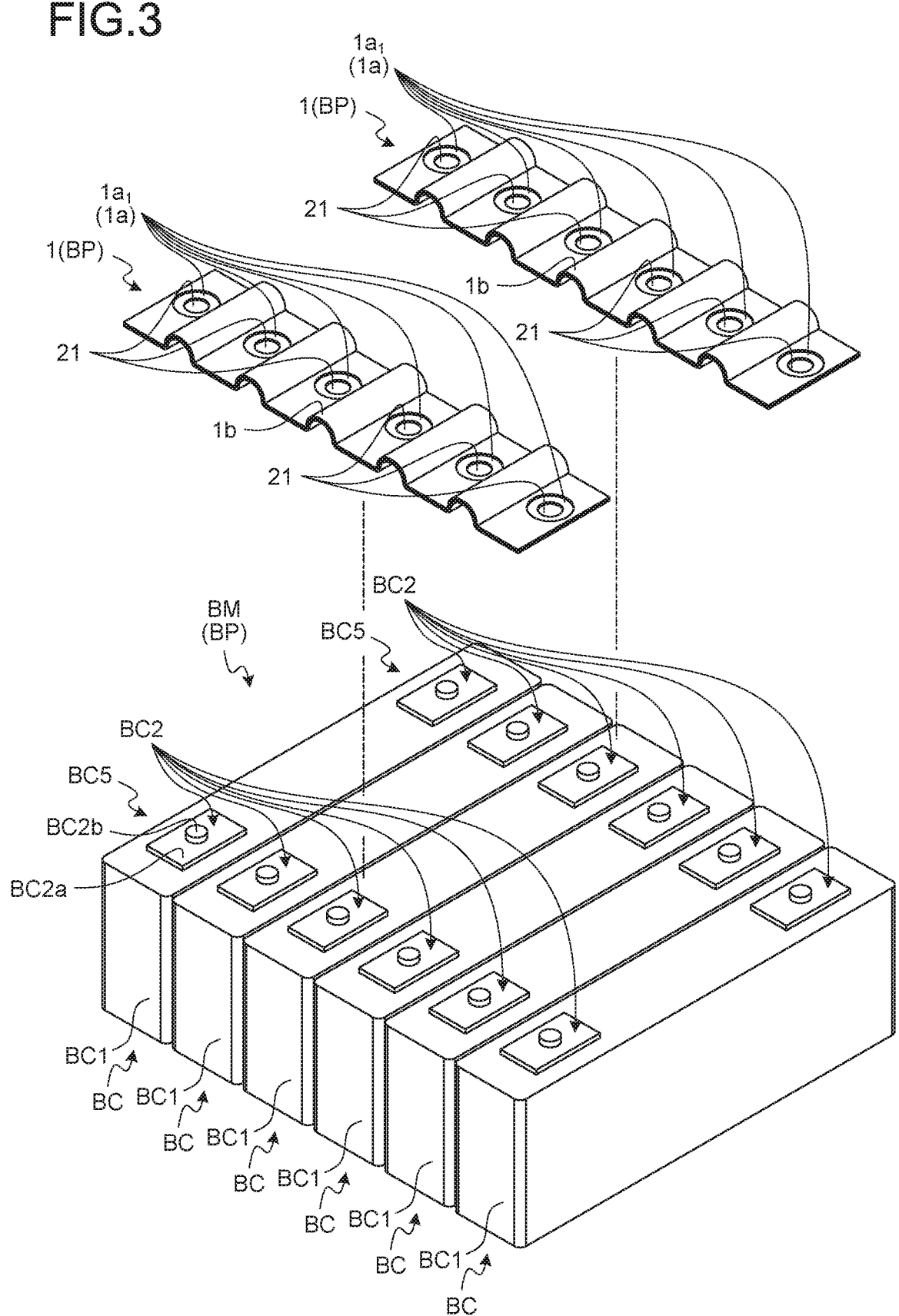
FIG. 3 is an exploded perspective view illustrating the laminated bus bars in the embodiment together with the battery module.

The laminated bus bar 1 in the embodiment is assembled on a battery module BM to configure a battery pack BP together with the battery module BM (FIG. 1 and FIG. 3). The battery pack BP is mounted on, for example, a vehicle (an electric automobile, a hybrid car, or the like) including a rotary machine as a driving source and is used for feeding electric power to the rotary machine, and so on.

The battery module BM includes a plurality of battery cells BC (FIG. 1 and FIG. 3). Each of the battery cells BC includes a cell body BC1 and two electrode terminals BC2 (FIG. 1 and FIG. 3). Each of the electrode terminals BC2 is provided on any desired place on an outer wall surface of the cell body BC in a state of being exposed to the outside, and one of the electrode terminals BC2 is a positive electrode and the other thereof is a negative electrode. In each of the battery cells BC of this example, the cell body BC1 has a cubic shape, and the two electrode terminals BC2 are provided on one outer wall surface of the cell body BC1 (FIG. 1 and FIG. 3). Each of the electrode terminals BC2 of this example has a main terminal portion BC2a that is formed into a rectangular flat plate shape and one flat surface of which faces the outer wall surface of the cell body BC1 and a columnar projecting portion BC2b that projects from the other flat surface of the main terminal portion BC2a (FIG. 2 and FIG. 3).

In this battery module BM, the battery cells BC are arranged to be laminated on each other in a state in which one electrode terminals BC2 of the respective battery cells BC are arrayed in a row and the other electrode terminals BC2 thereof are arrayed in a row (FIG. 3). The battery module BM forms a virtual cubic shape by the battery cells BC, and two electrode terminal groups BC5 each formed by the electrode terminals BC2 arrayed in a row along the lamination direction are provided on one of six wall surfaces of an assembly configured by the battery cells BC. The adjacent electrode terminals BC2 at the respective places are arranged at a constant pitch P1 in each electrode terminal group BC5. Although not illustrated in the drawings, what-is-called separators having insulating properties and plate shapes are interposed between the adjacent battery cells BC. The separators project to be higher than the outer wall surfaces of the cell bodies BC1 on the side of the electrode terminal groups BC5 to be interposed between the adjacent electrode terminals BC2.

In the battery module BM, when the battery cells BC are connected in series, the positive electrode terminals BC2 and the negative electrode terminals BC2 are alternately arranged in the electrode terminal groups BC5. The laminated bus bars 1 in this case are configured to physically and electrically connect the positive electrode terminals BC2 and the negative electrode terminals BC2 that are adjacent to each other. In contrast, in the battery module BM, when the battery cells BC are connected in parallel, all the electrode terminals BC2 in one electrode terminal group BC5 are positive and all the electrode terminals BC2 in the other electrode terminal group BC5 are negative. As the laminated bus bars 1 in this case, the laminated bus bar 1 that physically and electrically connects all the electrode terminals BC2 in one electrode terminal group BC5 and the laminated bus bar 1 that physically and electrically connects all the electrode terminals BC2 in the other electrode terminal group BC5 are prepared.

Figure 2:
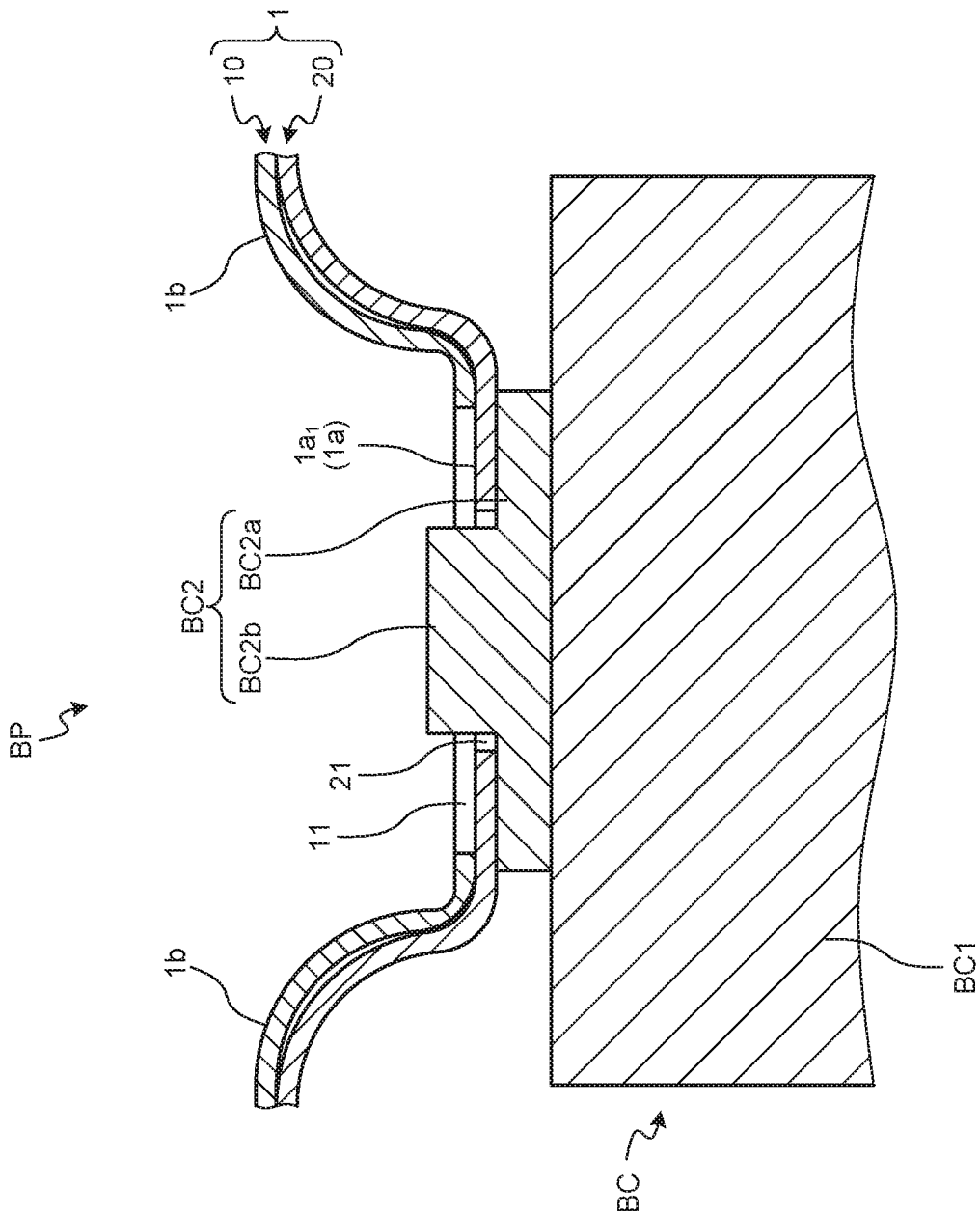
FIG. 2 is a cross-sectional view cut along line X-X in FIG. 1.
Figure 4:
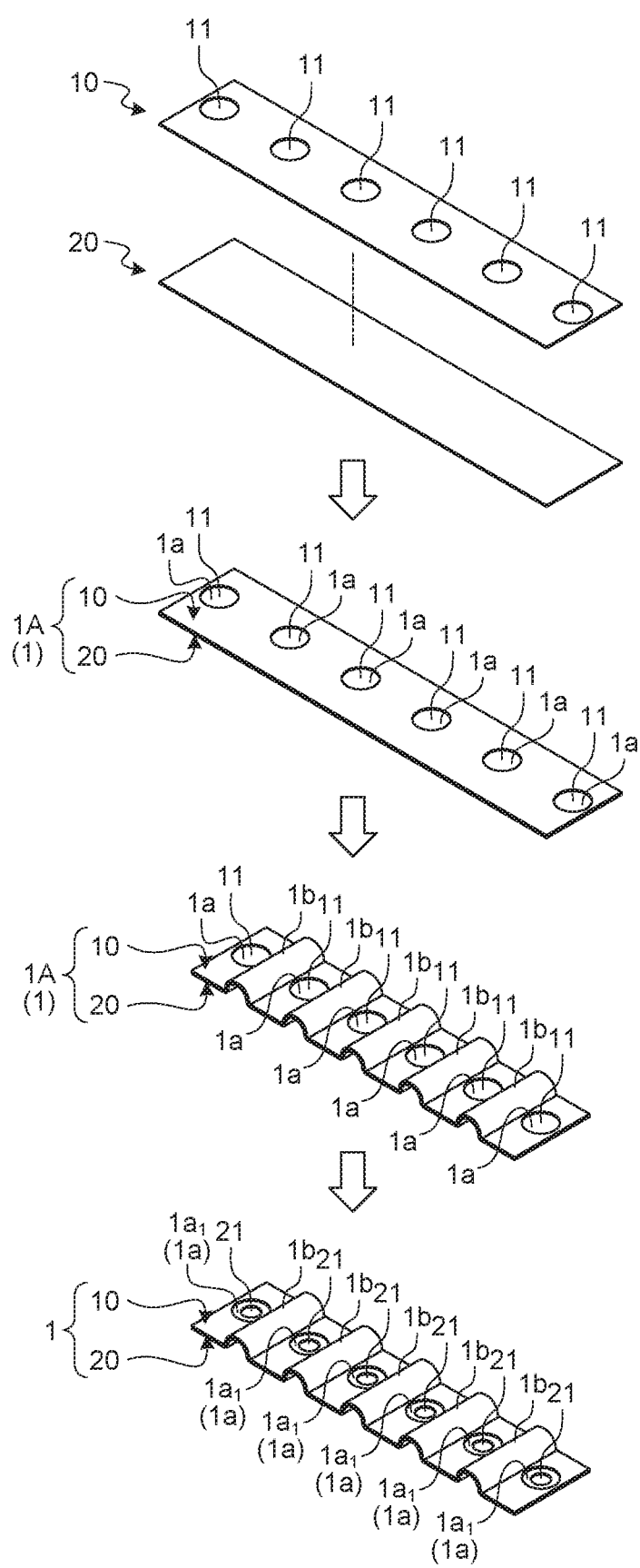
FIG. 4 is a descriptive view for explaining a method for manufacturing the laminated bus bar in the embodiment.

The laminated bus bar 1 in the embodiment includes a conductive plate-shaped first base member 10 and a conductive plate-shaped second base member 20 that are laminated on and fixed to each other (FIG. 2, FIG. 4, and FIG. 5).

The first base member 10 is a bus bar formed into a plate shape using a conductive material such as metal. The first base member 10 of this example is formed into a rectangular plate shape using a metal plate as a base material and has bending portions 1b as will be described later.

The first base member 10 has a plurality of first through-holes 11 serially arranged at a constant interval (FIG. 2, and FIG. 4 to FIG. 7). When, for example, the battery cells BC are connected in series or two battery cells BC are connected in parallel, two first through-holes 11 are formed in the first base member 10. When equal to or more than three battery cells BC are connected in parallel, the first through-holes 11 the number of which corresponds to the number of battery cells BC are formed in the first base member 10. The adjacent first through-holes 11 with the bending portions 1$b$ interposed therebetween are arranged in the first base member 10 at the pitch P1 of the adjacent electrode terminals BC2 (FIG. 6).

The second base member 20 is a bus bar formed into a plate shape using a conductive material such as metal. The second base member 20 of this example is formed into a rectangular plate shape using a metal plate as a base material and has the bending portions 1$b$ as will be described later.

The second base member 20 has a plurality of second through-holes 21 serially arranged at a constant interval (FIG. 2 to FIG. 6). The second through-holes 21 the number of which is the same as that of the first through-holes 11 are formed in the second base member 20. One first through-hole 11 and one second through-hole 21 form a pair in the laminated bus bar 1. Combinations of one first through-holes 11 and one second through-holes 21 forming the pairs are arranged such that the first through-hole 11 and the second through-hole 21 in each of the combinations face each other in the lamination direction of the first base member 10 and the second base member 20. The adjacent second through-holes 21 with the bending portions 1$b$ interposed therebetween are formed in the second base member 20 at the pitch P1 of the adjacent electrode terminals BC2 (FIG. 6). Hereinafter, the lamination direction of the first base member 10 and the second base member 20 is simply referred to as a "lamination direction" unless otherwise specified.

The second through-holes 21 are formed to be smaller than the first through-holes 11 (FIG. 5 and FIG. 6). Portions of the second base member 20 that overlap with the first through-holes 11 in the lamination direction in the circumferential edges of the second through-holes 21 in the second base member 20 are formed as thin portions 1$a_1$ having small plate thicknesses in the first base member 10 and the second base member 20 in a laminated state (FIG. 1 to FIG. 6). In this example, the first through-holes 11 having circular shapes are formed. In this example, the second through-holes 21 having circular shapes are formed. The first through-holes 11 and the second through-holes 21 forming the pairs are coaxially arranged in the laminated. bus bar 1. The thin portions 1$a_1$ are therefore formed into ring shapes.

The bending portions 1$b$ that are elastically deformable along the array direction of the first through-holes 11 are formed between the adjacent first through-holes 11 in this example (FIG. 1 to FIG. 6). The bending portions 1$b$ are formed so as to absorb tolerance variations of the pitch P1 of the adjacent electrode terminals BC2 and change the intervals between the adjacent first through-holes 11 and the intervals between the adjacent second through-holes 21 with the elastic deformation. The bending portions 1$b$ of this example are bent in an arc-like form. The bending portions 1$b$ of this example are formed so as to avoid the projecting portions of the above-mentioned separators.

The method for manufacturing the laminated bus bar 1 is described together with a manufacturing apparatus 100.

The method for manufacturing the laminated bus bar 1 includes a first base member forming process of forming the first through-holes 11 in a serially arrayed manner at a constant pitch in the conductive flat plate-shaped first base member 10 and a second base member forming process of forming the conductive flat plate-shaped second base member 20 (FIG. 4).

The first base member forming process has a first process of forming the conductive flat plate-shaped first base member 10. In the first process of this example, the rectangular flat plate-shaped first base member 10 is formed using the metal plate as the base material. The first base member forming process has a second process of forming the first through-holes 11 in the serially arrayed manner at the constant pitch in the flat plate-shaped first base member 10. In the second process of this example, the circular first through-holes 11 are formed in the serially arrayed manner at a constant pitch P2 (FIG. 7). In this example, the bending portions 1$b$ are formed later. The pitch P2 of the adjacent first through-holes 11 is therefore set to be larger than the pitch P1 of the adjacent electrode terminals BC2 by the length corresponding to the shape of the bending portions 1$b$. When the bending portions 1$b$ need not be provided in the laminated bus bar 1, in the second process, the first through-holes 11 are formed in the serially arrayed manner at the pitch P1 equivalent to that of the adjacent electrode terminals BC2 in the flat plate-shaped first base member 10.

The first base member forming process may be performed such that the second process is executed after the first process or the first process and the second process are executed simultaneously.

The first base member forming process is executed using a first base member forming machine 110 (FIG. 8). The first base member forming machine 110 is, for example, a press forming machine capable of executing the first base member forming process.

In the second base member forming process, the flat plate-shaped second base member 20 having a size equivalent to that of the flat plate-shaped first base member 10 is formed. In the second base member forming process of this example, the rectangular flat plate-shaped second base member 20 is formed using the metal plate as the base material.

The second base member forming process is executed using a second base member forming machine 120 (FIG. 8). The second base member forming machine 120 is, for example, a press forming machine capable of executing the second base member forming process.

Furthermore, the method for manufacturing the laminated bus bar 1 includes a laminating process of forming a laminated body 1A configured by laminating and fixing flat surfaces of the flat plate-shaped first base member 10 and the flat plate-shaped second base member 20 on and to each other (FIG. 4). The laminating process is executed using a laminating machine 130 (FIG. 8).

With the laminating process, in the flat plate-shaped first base member 10 and the flat plate-shaped second base member 20 in a laminated state, portions of the second base member 20 that face the first through-holes 11 are thin plate portions 1$a$ having small plate thicknesses (FIG. 4 and FIG. 7). In this example, the disc-shaped thin plate portions 1$a$ are formed.

In the laminating process, in order to easily form the bending portions 1$b$ later and make the bending portions 1$b$ have elasticity, flat surfaces of the first base member 10 and the second base member 20 other than portions that become the bending portions 1$b$ later are fixed to each other. In the laminating process, the flat surfaces are welded on each other, for example. In this case, the laminating machine 130 includes, for example, a movable arm configured to place the first base member 10 on the second base member 20 on a conveyor and a welding machine configured to weld the laminated first base member 10 and second base member 20. In the laminating process, the flat surfaces may be fixed to each other with an adhesive. In this case, the laminating machine 130 includes, for example, a coating machine configured to coat the second base member 20 on a conveyor with the adhesive, a movable arm configured to place the first base member 10 on the second base member 20, and a pressing machine configured to pinch and press the first base member 10 and the second base member 20 until the adhesive is solidified.

The method for manufacturing the laminated bus bar 1 further includes a bending process of bending sites between the adjacent first through-noes 11 in the laminated body 1A to form the bending portions 1b that are elastically deformable along the array direction of the first through-holes 11 (FIG. 4).

In the bending process, the sites between the adjacent first through-holes 11 in the laminated body 1A are bent such that the pitch P2 of the adjacent first through-holes 11 in the flat plate-shaped first base member 10 is the pitch P1. In the bending process of this example, the bending portions 1b bent in the arc-like form so as to project in the same direction are formed.

The bending process is executed using a bending machine 140 (FIG. 8). The bending machine 140 is, for example, a press forming machine capable of executing the bending process.

The bending process is omitted when the bending portions 1b need not be provided in the laminated bus bar 1.

The method for manufacturing the laminated bus bar 1 further includes a punching process of forming, in the second base member 20 of the laminated body 1A, the second through-holes 21 forming the pairs with the first through holes 11, the second through-holes 21 being smaller than the first through-holes 11 in portions overlapping with the first through-holes 11 in the lamination direction of the first base member 10 and the second base member 20, the second through-holes 21 in the combinations of the first through-holes 11 and the second through-holes 21 forming the pairs being formed in the serially arrayed manner at the constant pitch P1 (FIG. 4).

In the punching process, the second through-holes 21 are formed in the thin plate portions 1a of the second base member 20 in a one-to-one correspondence manner.

When the bending portions 1b need not be provided in the laminated bus bar 1, in the punching process, the second through-holes 21 are formed in the serially arrayed manner at the pitch P1 equivalent to that of the adjacent first through-holes 11 in the flat plate-shaped first base member 10. The bending portions 1b are provided in the laminated bus bar 1, so that in the punching process of this example, the second through-holes 21 are formed in the serially arrayed manner at the pitch P1 equivalent to that of the adjacent electrode terminals BC2 in the second base member 20 of the laminated body 1A in which the bending portions 1b are provided. In both the cases, the pitch P1 of the adjacent second through-holes 21 becomes the pitch P1 of the adjacent electrode terminals BC2 of the adjacent battery cells BC.

In the punching process of this example, the circular second through-holes 21 are formed in the serially arrayed manner at the constant pitch P1. In the punching process, portions of the second base member 20 that overlap with the first through-holes 11 in the lamination direction in the circumferential edges of the second through-holes 21 in the second base member 20 are formed as the thin portions $1a_1$ having the small plate thicknesses in the first base member 10 and the second base member 20 in the laminated state.

The punching process is executed using a punching machine 150 (FIG. 8). The punching machine 150 is, for example, a press forming machine capable of executing the punching process.

The manufacturing apparatus 100 for the laminated bus bar 1 includes, for example, a control device 101 and causes the control device 101 to control operations of the first base member forming machine 110, the second base member forming machine 120, the laminating machine 130, the bending machine 140, and the punching machine 150 (FIG. 8).

The laminated bus bar 1 is shaped as described above. The laminated bus bars 1 are arranged in a state of being positioned on the battery module BM by inserting the projecting portions BC2b of the electrode terminals BC2 through the second through-holes 21 one by one. With this arrangement, the thin portions $1a_1$ of the laminated bus bars 1 are respectively made surface contact with the main terminal portions BC2a of the electrode terminals BC2. The laminated bus bars 1 are physically and electrically connected to the battery cells BC by welding the respective thin portions $1a_1$ on the main terminal portions BC2a of the electrode terminals BC2 (for example, laser welding), thereby being fixed to the battery module BM.

In the embodiment, the laminated bus bar 1 configured by the two base members (first base member 10 and second base member 20) as used as an example. The laminated bus bar 1 in the embodiment may however be configured by equal to or more than three base members. The laminated bus bar 1 includes, for example, the first base members 10 mentioned above and one second base member 20 mentioned above, and the first base members 10 are laminated on and fixed to one flat surface of the second base member 20. In the laminated bus bar 1, the first through-holes 11 in the first base members 10 face each other in the lamination direction, and the second through-holes 21 and the thin portions $1a_1$ of the second base member 20 face the respective first through-holes 11 in the lamination direction.

The method for manufacturing the laminated bus bar 1 and the manufacturing apparatus 100 therefor in the embodiment as described above can produce the laminated bus bar 1 in which the base members (at least one first base member 10 and one second base member 20) are laminated on and fixed to each other, and the second through-holes 21 (for welding) (through-holes facing the first through-holes 11, the second through-holes 21 being smaller than the first through-holes 11) are formed in one second base member 20. In other words, the method for manufacturing the laminated bus bar 1 and the manufacturing apparatus 100 therefor can produce the laminated bus bar 1 in which the base members (at least one first base member 10 and one second base member 20) are laminated on and fixed to each other, and the thin portions $1a_1$ (for welding) are formed in one second base member 20. In contrast, the conventional bus bar in the layered form is configured by bending one metal plate into the layered form and therefore has the limitation on the plate thickness enabling the bending process. The method for manufacturing the laminated bus bar 1 and the manufacturing apparatus 100 therefor in the embodiment can therefore manufacture the laminated bus bar 1 having a larger volume than that of the conventional bus bar in the layered form. That is to say, the method for manufacturing the laminated bus bar 1 and the manufacturing apparatus 100 therefor in the embodiment can easily increase the volume of the laminated bus bar 1. Accordingly, the method for manufacturing the laminated bus bar 1, the manufacturing apparatus 100 for the laminated bus bar 1, and the laminated bus bar 1 in the embodiment can be easily adapted to the battery cells BC having an increased calorific value.

In the method for manufacturing the laminated bus bar 1 and the manufacturing apparatus 100 therefor in the embodiment, the first base member 10 in which the first through-holes 11 are formed is laminated on and fixed to the second base member 20, and then, the second through-holes 21 smaller than the first through-holes 11 are formed in the second base member 20. In contrast, when the method for manufacturing the laminated bus bar 1 and the manufacturing apparatus 100 therefor are not used, after two base members are laminated on and fixed to each other, first through-holes are formed in one base member by counter boring and through-holes smaller than the first through-holes are formed in the other base member by punching. The method for manufacturing the laminated bus bar 1 and the manufacturing apparatus 100 therefor in the embodiment can therefore reduce switching of facilities and increase in the number of processes as compared with the conventional ones.

In the method for manufacturing the laminated bus bar 1 and the manufacturing apparatus 100 therefor in the embodiment, the base members (at least one first base member 10 and one second base member 20) are laminated on and fixed to each other, and then, the second through-holes 21 are formed, whereby positional accuracy of the second through-hoes 21 can be enhanced. In particular, in this example, the second through-holes 21 are formed after the bending process, so that the positional accuracy of the second through-holes 21 can be enhanced as compared with the case in which the second through-holes 21 are formed before the bending process.

The conventional bus bar in the layered form is configured by bending one metal plate into the layered form. The strength can therefore be lowered when the bending portions 1b as in the laminated bus bar 1 in the embodiment are formed. For this reason, the bending portions 1b cannot be formed in the conventional bus bar in the layered form, and it is therefore difficult to absorb the tolerance variations of the pitch P1 of the adjacent electrode terminals BC2. Due to this, lowering of assembly workability of the bus bar, such as difficulty in assembly thereof on the battery module BM, can occur. The laminated bus bar 1 in the embodiment can absorb the tolerance variations of the pitch P1 of the adjacent electrode terminals BC2, so that excellent assembly workability on the battery module BM and a high yield can be provided.

The method for manufacturing the laminated bus bar and the manufacturing apparatus therefor according to the embodiment can produce the laminated bus bar in which the base members (the first base member and the second base member) are laminated on and fixed to each other, and the second through-holes (through-holes facing the first through-holes, the through-holes being smaller than the first through-holes) are formed in one second base member. In other words, the method for manufacturing the laminated bus bar and the manufacturing apparatus therefor can produce the laminated bus bar in which the base members (the first base member and the second base member) are laminated on and fixed to each other, and the thin portions for welding are formed in one second base member. As described above, the conventional bus bar in the layered form (configured by bending one metal plate into the layered form) is configured by bending one metal plate into the layered form and therefore has the limitation on the plate thickness enabling the bending process. The method for manufacturing the laminated bus bar and the manufacturing apparatus therefor according to the embodiment can therefore manufacture the laminated bus bar having a larger volume than that of the conventional bus bar in the layered form. That is to say, the method for manufacturing the laminated bus bar and the manufacturing apparatus therefor according to the embodiment can easily increase the volume of the laminated bus bar. Accordingly, the method for manufacturing the laminated bus bar, the manufacturing apparatus for the laminated bus bar, and the laminated bus bar according to the embodiment can be easily adapted to the battery cells having an increased calorific value.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method for manufacturing a laminated bus bar, the method comprising:
    a first base member forming process of forming a plurality of first through-holes in a serially arrayed manner at a constant pitch in a conductive flat plate-shaped first base member;
    a second base member forming process of forming a conductive flat plate-shaped second base member;
    a laminating process of forming a laminated body configured by laminating and fixing flat surfaces of the first base member and the second base member on and to each other; and
    a punching process of forming, in the second base member of the laminated body, second through-holes forming pairs with the first through-holes, the second through-holes being smaller than the first through-holes in portions overlapping with the first through-holes in a lamination direction of the first base member and the second base member, the second through-holes in combinations of the first through-holes and the second through-holes forming the pairs being formed in a serially arrayed manner at a constant pitch.

2. The method for manufacturing the laminated bus bar according to claim 1, wherein
    in the punching process, portions of the second base member that overlap with the first through-holes in the lamination direction in circumferential edges of the second through-holes in the second base member are formed as thin portions having small plate thicknesses in the first base member and the second base member in a laminated state.

3. The method for manufacturing the laminated bus bar according to claim 1, further comprising:
    between the laminating process and the punching process, a bending process of bending sites between the adjacent first through-holes in the laminated body to form bending portions that are elastically deformable along an array direction of the first through-holes.

4. The method for manufacturing the laminated bus bar according to claim 2, further comprising:
    between the laminating process and the punching process, a bending process of bending sites between the adjacent first through-holes in the laminated body to form bending portions that are elastically deformable along an array direction of the first through-holes.

5. The method for manufacturing the laminated bus bar according to claim 1, wherein a pitch of the adjacent second through-holes is a pitch of adjacent electrode terminals of a plurality of battery cells adjacent to each other in a battery module in which the battery cells are arranged to be laminated on each other.

6. The method for manufacturing the laminated bus bar according to claim 2, wherein
a pitch of the adjacent second through-holes is a pitch of adjacent electrode terminals of a plurality of battery cells adjacent to each other in a battery module in which the battery cells are arranged to be laminated on each other.

7. The method for manufacturing the laminated bus bar according to claim 3, wherein
a pitch of the adjacent second through-holes is a pitch of adjacent electrode terminals of a plurality of battery cells adjacent to each other in a battery module in which the battery cells are arranged to be laminated on each other.

8. The method for manufacturing the laminated bus bar according to claim 4, wherein
a pitch of the adjacent second through-holes is a pitch of adjacent electrode terminals of a plurality of battery cells adjacent to each other in a battery module in which the battery cells are arranged to be laminated on each other.

9. A manufacturing apparatus for a laminated bus bar, the manufacturing apparatus comprising:
a first base member forming machine that forms a plurality of first through-holes in a serially arrayed manner at a constant pitch in a conductive flat plate-shaped first base member;
a second base member forming machine that forms a conductive flat plate-shaped second base member;
a laminating machine that forms a laminated body configured by laminating and fixing flat surfaces of the first base member and the second base member on and to each other;
a punching machine that forms, in the second base member of the laminated body, second through-holes forming pairs with the first through-holes, the second through-holes being smaller than the first through-holes in portions overlapping with the first through-holes in a lamination direction of the first base member and the second base member, the second through-holes in combinations of the first through-holes and the second through-holes forming the pairs being formed in a serially arrayed manner at a constant pitch.

10. A laminated bus bar comprising:
a conductive plate-shaped first base member that has a plurality of first through-holes serially arranged at a constant interval; and
a conductive plate-shaped second base member that has a plurality of second through-holes serially arranged at a constant interval and is laminated on and fixed to the first base member, wherein
the second through-holes are smaller than the first through-holes,
combinations of one of the first through-holes and one of the second through-holes forming pairs are arranged such that the first through-hole and the second through-hole in each of the combinations face each other in a lamination direction of the first base member and the second base member,
portions of the second base member that overlap with the first through-holes in the lamination direction in circumferential edges of the second through-holes in the second base member are formed as thin portions having small plate thicknesses in the first base member and the second base member in a laminated state, and
bending portions that are elastically deformable along an array direction of the first through-holes are formed between the adjacent first through-holes.

* * * * *